Patented Nov. 15, 1949

2,488,379

UNITED STATES PATENT OFFICE 2,488,379

QUINAZOLINE DERIVATIVES

Francis Henry Swinden Curd, Justus Kenneth Landquist, Clifford Gordon Raison, and Francis Leslie Rose, Blackley, Manchester, England, assignors to Imperial Chemical Industries Limited, a corporation of Great Britain No Drawing. Application July 31, 1945, Serial No. 608,088. In Great Britain August 31, 1944

7 Claims. (Cl. 260—251)

1

This invention relates to the manufacture of new heterocyclic compounds. More particularly it relates to the manufacture of new quinoline and quinazoline derivatives which are useful as chemotherapeutic agents and particularly parasiticidal agents, especially against the parasites which cause malaria.

We have found that new quinoline and quinazoline derivatives which bear in the 2- or 4-position an arylamino group devoid of acidic substituents and in the 4- or 2-position a basic group of the formula NR″—A—NRR′ wherein R″ stands for hydrogen or an alkyl or simply substituted alkyl group, for example an alkoxyalkyl or dialkylaminoalkyl group, A is a linking group which is aliphatic or alicyclic or aliphatic-carbocyclic and is devoid of acidic substituents but may be substituted, for example, by hydrocarbon radicals, hydroxy or alkoxy groups, or dialkylaminoalkyl groups, and, where A or part of A is an aliphatic chain, it may be interrupted by oxygen, nitrogen or sulphur atoms, and NRR′ is a strongly basic amino or substituted amino group such as alkylamino or dialkylamino or piperidino or other strongly basic nitrogen-containing heterocyclic group, and which optionally bear in the other nuclear positions one or more non-acidic substituents, for example, alkyl, alkoxy, halogen or nitro groups or fused-on carbocylic rings (as in the case of a benzo-quinoline or benzo-quinazoline), may be made by interaction of a diamine NR″—A—NRR′ with an appropriate 2- or 4-arylamino-quinoline or -quinazoline which is devoid of acidic substituents and bears in the 4- or 2-position a labile group such as a halogen atom or a hydrocarbon radical which is attached by means of an ether or thioether linkage, for example, an alkoxy, aryloxy or alkylmercapto group.

The arylamino group present as substituent in the 2- or 4-position may be unsubstituted or may bear one or more substituents provided that it is devoid of acidic groups such as sulphonic or carboxylic acid groups or phenolic groups. Thus it may bear as substituents, for instance, halogen atoms, nitro groups, hydrocarbon radicals (which themselves may optionally bear substituents and which may be attached to the arylamino group directly or through an oxygen, nitrogen or sulphur atom or through a carbonyl group), cyano groups or esterified carboxyl groups.

The reaction is conveniently brought about by heating the reagents together, optionally in presence of a solvent or diluent.

The 2-halogeno-4-arylaminoquinazolines required as one class of starting materials may be obtained by interaction of appropriate arylamines with 2:4-dihalogenoquinazolines. The isomeric 4-halogeno-2-arylaminoquinazolines may be made by halogenation (conveniently with a phosphorus oxyhalide or pentahalide) of the corresponding 4-hydroxy-compounds, themselves obtained by interaction of appropriate arylamines with 2-chloro-4-hydroxy-quinazolines. The 2-arylamino-4-halogenoquinolines may be made by interaction of appropriate arylamines with 2:4-dihalogenoquinolines as described in copending application of Curd, Raison and Rose, Serial No. 608,087, of even filing date herewith, now Patent No. 2,472,066. The isomeric 2-halogeno-4-arylaminoquinolines may be made by halogenation (conveniently with a phosphorus oxyhalide or pentahalide of the corresponding 2-hydroxy-4-arylamino-quinolines, themselves made by interaction of the appropriate arylamine with a 2:4-dihydroxyquinoline. The alternative starting materials containing ether or thioether groups can readily be made by interaction of the halogeno-derivatives with appropriate hydroxy or mercapto compounds or with alkali metal derivatives of such compounds, or, in the case of some of the 2-arylamino-4-alkoxy-quinazolines, by interaction of an appropriate arylamine with the 2-chloro-4-alkoxy-quinazoline.

A further feature of the invention is a modified process wherein the basic substituent NR″—A—NRR′ is introduced by stages. Thus the arylamino-quinoline or -quinazoline compound carrying a labile group in the 2- or 4-position is brought into reaction with an amino-compound of the form NHR″—A′—B where A′ represents either the whole or part of the linking group A defined above and where B stands for a reactive group which is then converted directly or indirectly by methods involving the step of reaction with ammonia or a primary or secondary amine into the group NRR′ or into a group A″—NRR′ such that A′ and A″ together constitute the linking group A. For example, the group B may be a hydroxy group or a derivative thereof which is, or is readily convertible to, a reactive ester thereof, such as a halide, this then being brought into reaction with an amine NHRR′ or an amino-substituted amine NH₂—A‴—NRR′ or a hydroxy- or mercapto-substituted amine HO—A‴—NRR′ or HS—A‴—NRR′ (or an alkali metal derivative of such a hydroxy or mercapto compound) such that A′—NH—A‴, A′—O—A‴ or A′—S—A‴ constitutes the linking group A previously mentioned. Another alternative is to bring the labile group in the 2- or 4-position of the arylamino-quinoline or quinazoline compound into reaction with an acylated diamine NHR''—A'—NHAc and then to hydrolyse off the acyl group. Further, if desired, the free amino group so generated may be modified, as by alkylation, conversion to a heterocyclic group such as piperidino or by bringing it into reaction with a halogeno-substituted amine Hal—A'''—NRR' such that A'—NH—A''' constitutes the linking group A.

Still a different mode of synthesis is disclosed in our copending application of even date, Serial No. 608,086. This mode of synthesis consists of starting with a quinoline or quinazoline compound having, for instance, a chlorine atom in the 2-position and the requisite dialkylamino-alkylamino radical in the 4-position, and condensing this with the selected arylamine such as p-chloraniline.

The new compounds are strongly basic colourless or pale yellow viscous oils or crystalline solids which form salts with mineral and organic acids. The salts with mineral acids such as hydrogen halides, sulphuric and phosphoric acids or with lower organic acids such as acetic, lactic, tartaric and lower alkane sulphonic acids (e. g. methanesulphonic acid) are water-soluble. The salts with acids of higher molecular weight such as methylene bis-2:3-hydroxynaphthoic acid and methylene-bis-salicylic acid are more sparingly soluble in water. In many of these compounds a substituent in the arylamino group or in the quinoline or quinazoline nucleus (and more particularly in the benzene ring thereof) is capable of ready conversion into another suitable substituent. Thus, for example, a nitro group may be reduced to an amino group and this in turn can readily be converted into a halogen atom or a cyano group.

The following examples, in which the parts are by weight illustrate but do not limit the invention.

Example 1

1.2 parts of 4-chloro-2-p-chloroanilinoquinazoline (M. P. 177°–178° C., made by interaction of p-chloroaniline with 2-chloro-4-hydroxy-quinoline and subsequent halogenation with phosphorus oxychloride), 1 part of β-diethylaminoethylamine and 5 parts of glacial acetic acid are heated together at 95°–100° C. for 1½ hours. The reaction mixture is then diluted with 20 parts of water, heated to boiling and filtered to remove a small amount of insoluble material (mainly 2-p-chloroanilino-4-hydroxyquinazoline). 5 parts of concentrated hydrochloric acid are added to the filtrate, whereupon 2-p-chloroanilino-4-β-diethylaminoethylaminoquinazoline dihydrochloride separates out and is filtered off and dried. It has M. P. 254°–255° C.

Example 2

8 parts of 4-chloro-2-p-chloroanilinoquinazoline and 4 parts of γ-diethylaminopropylamine are heated and stirred together at 140°–150° C. for 2 hours. The reaction mixture is cooled and extracted with 200 parts of 5% acetic acid and the extract is washed with ether and then made alkaline by addition of ammonia. The base which is precipitated is extracted with ether, the ether solution is dried and the ether is distilled off. 2-p-chloroanilino-4-γ-diethylaminopropylaminoquinazoline remains as an oil which crystallises on standing. It is recrystallised from petroleum ether and then has M. P. 126°–127° C.

Example 3

By working in the manner described in Example 2, but using 4-chloro-2-p-methoxyanilinoquinazoline instead of 4-chloro-2-p-chloroanilinoquinazoline, there is obtained 2-p-methoxyanilino-4-γ-diethylaminopropylaminoquinazoline of M. P. 114°–115° C. The 4-chloro-2-p-methoxyanilinoquinazoline used as starting material is made by the action of phosphorus oxychloride on 2-p-methoxyanilino-4-hydroxyquinazoline (M. P. 265°–266° C.), itself made by reaction of p-anisidine with 2-chloro-4-hydroxyquinazoline.

Again by working as described in Example 2, but using other appropriate diamines instead of the γ-diethylaminopropylamine, the following 4-substituted 2-p-chloroanilinoquinazolines are obtained:

Example 4

2-p-chloroanilino-4-β-dimethylaminoethylaminoquinazoline dihydrochloride, M. P. 267°–268° C.

Example 5

2-p-chloroanilino-4-γ-dimethylaminopropylaminoquinazoline dihydrochloride, M. P. 255° C.

Example 6

2-p-chloroanilino-4-γ-piperidinopropylaminoquinazoline dihydrochloride, M. P. 285°–286° C.

Example 7

2-p-chloroanilino-4-γ-butylaminopropylaminoquinazoline dihydrochloride, M. P. 252°–253° C.

Example 8

2-p-chloroanilino-4-δ-diethylaminobutylaminoquinazoline dihydrochloride, M. P. 260°–262° C.

Example 9

2-p-chloroanilino-4-β-acetylaminoethylaminoquinazoline hydrochloride, M. P. 278°–280° C. 9.4 parts of this hydrochloride are then refluxed for 3 hours with 15 parts of water, 50 parts of ethanol and 30 parts of concentrated hydrochloric acid. The solution so obtained is diluted with water and made alkaline with caustic soda, whereupon 2-p-chloroanilino-4-β-aminoethylamino-quinazoline separates out. After crystallisation from petroleum ether it has M. P. 142° C.

Example 10

3 parts of 2-p-chloroanilino-4-ethoxyquinazoline (M. P. 122° C., made by reaction of p-chloroaniline with 2-chloro-4-ethoxyquinazoline) and 2.5 parts of β-diethylaminoethylamine are heated together for 3 hours at 140°–150° C. in a vessel provided with a reflux condenser so adjusted as to retain the diamine but to permit the escape of the ethanol formed in the reaction. The reaction mixture is then cooled and dissolved in 100 parts of boiling 10% acetic acid. The solution is filtered to remove a small proportion of insoluble matter and cooled. 50 parts of concentrated hydrochloric acid are added whereupon 2-p-chloroanilino-4-β-diethylaminoethylaminoquinazoline dihydrochloride is precipitated. It is recrystallised from water and then has M. P. 254°–255° C.

By working in the way described in Example 10, but using other appropriate diamines instead of the β-diethylaminoethylamine, the following further 4-substituted 2-p-chloroanilinoquinazolines are obtained:

Example 11

2-p-chloroanilino-4-γ-dibutylaminopropylaminoquinazoline dihydrochloride, M. P. 193°–194° C.

Example 12

2-p-chloroanilino-4-δ-dibutylaminobutylaminoquinazoline dihydrochloride, M. P. 181° C.

Example 13

2-p-chloroanilino-4-δ-dimethylaminobutylaminoquinazoline dihydrochloride, M. P. 261° C.

Example 14

2-p-chloroanilino-4-(5'-dimethylaminoamylamino)-quinazoline dihydrochloride, M. P. 278° C.

Example 15

2-p-chloroanilino-4(6'-dimethylaminohexylamino)-quinazoline dihydrochloride, M. P. 156°–158° solidifying on further heating and melting again at 236°–238° C.

Example 16

2-p-chloroanilino-4-β-piperidinopropylaminoquinazoline dihydrochloride, M. P. 283°–286° C.

Example 17

2-p-chloroanilino-4-γ(N-methyl-N-isopropylamino)-propylaminoquinazoline dihydrochloride, M. P. 268°–269° C.

Example 18

14.5 parts of 2-chloro-4-p-chloroanilinoquinazoline (conveniently made by interaction of p-chloroaniline with 2:4-dichloroquinazoline in acetone or in aqueous suspension at room temperature) and 6.5 parts of γ-diethylaminopropylamine are heated together at 120°–130° C. for 2 hours. The reaction mixture is cooled and extracted with 5% acetic acid. The extract is made alkaline by addition of ammonia and the base which is precipitated is extracted with ether. The ether solution is dried and the ether is distilled off. The residue on cooling becomes a glass which slowly crystallises. It is 2-γ-diethylaminopropylamino-4-p-chloroanilinoquinazoline. After recrystallisation from petroleum ether it has M. P. 107°–108° C.

Example 19

3 parts of 2-p-chloroanilino-4-ethoxyquinazoline and 3.5 parts of 5-diethylamino-2-aminopentane are heated together for 4 hours at 180°–190° C. in a vessel provided with a reflux condenser which retains the diamine but permits the escape of the ethanol formed during the reaction. The reaction mixture is cooled and extracted with 100 parts of boiling 15% acetic acid. The extract is cooled and 40 parts of concentrated hydrochloric acid are added, whereupon 2-p-chloroanilino-4-δ-diethylamino-α-methylbutylamino-quinazoline dihydrochloride slowly crystallises out. After recrystallisation from water it forms small needle-shaped crystals of M. P. 122° C., solidifying on further heating and remelting at 250°–252° C.

By working in a similar manner but using other appropriate diamines instead of the 5-diethylamino-2-aminopentane, there are obtained the following further compounds:

Example 20

2-p-chloroanilino-4-β-piperidinoethylaminoquinazoline dihydrochloride, M. P. 280°–284° C.

Example 21

2-p-chloroanilino-4-β-pyrrolidinoethylaminoquinazoline dihydrochloride, M. P. 283°–285° C.

Example 22

2-p-chloroanilino-4-β-piperidino-α-methylethylamino-quinazoline dihydrochloride, M. P. 274°–275° C.

Example 23

By working in a manner essentially similar to that described in Example 19 but at a temperature of 140°–150° C. and using γ-butylaminopropylamine instead of the 5-diethylamino-2-aminopentane, there is obtained 2-p-chloroanilino-4-γ-butylaminopropylaminoquinazoline dihydrochloride of M. P. 254°–256° C.

Example 24

3 parts of 2-p-chloroanilino-4-ethoxy-quinazoline and 3 parts of ethylene diamine hydrate are boiled under reflux for 2 hours. The reaction mixture is cooled and extracted with 50 parts of boiling 10% acetic acid. 5 parts of concentrated hydrochloric acid are added to the extract, whereupon 2-p-chloroanilino-4-β-aminoethylaminoquinazoline dihydrochloride is precipitated. It has M. P. 314°–316° C. The free base, which is readily obtained by treating the dihydrochloride with caustic soda, has M. P. 142° C.

Example 25

By working in a manner similar to that described in Example 24 but using a temperature of 150° C. and hexamethylene diamine instead of ethylene diamine there is obtained 2-p-chloroanilino-4-(6'-aminohexylamino)-quinazoline dihydrochloride of M. P. 261°–263° C.

Example 26

3 parts of 2-p-chloroanilino-4-ethoxy-quinazoline and 5 parts of γ-(N-methyl-N-β-diethylaminoethylamino)-propylamine are heated together for 4 hours at 150°–160° C. in a vessel provided with a reflux condenser which retains the diamine but permits the escape of the ethanol formed during the reaction. The reaction mixture is cooled and extracted with 70 parts of boiling 10% acetic acid. The extract is cooled and there are added 10 parts of concentrated hydrochloric acid and 30 parts of saturated potassium iodide solution, whereupon 2-p-chloroanilino-4-γ-(N-methyl-N-β-diethylaminoethylamino)-propylaminoquinazoline trihydriodide is precipitated. It is filtered off and recrystallised from water; it then has M. P. 229° C.

Example 27

10 parts of 2-p-chloroanilino-4-phenoxyquinazoline (M. P. 186°–187° C., made by reaction of p-chloroaniline with 2-chloro-4-phenoxyquinazoline) and 15 parts of β-diethylaminoethylamine are heated together at 140°–150° C. for 2½ hours. The reaction mixture is cooled, 100 parts of 5% caustic soda solution are added and the oil which is formed is extracted with ether. The ether solution is washed with 5% caustic soda solution and with water and is then extracted with 150 parts of 5% acetic acid. 50 parts of concentrated hydrochloric acid are added to the acetic acid extract whereupon 2-p-chloroanilino-4-β-diethylaminoethylamino-quinazoline dihydrochloride is precipitated in the form of needle shaped crystals of M. P. 254°–255° C.

Example 28

3 parts of 2-p-chloroanilino-4-methylthioquinazoline (M. P. 176° C., made by interaction of p-chloroaniline with 2-chloro-4-methylthioquinazoline) and 3 parts of β-diethylaminoethylamine are refluxed together for 6 hours. Reaction occurs and methyl mercaptan is evolved. The reaction mixture is cooled and extracted with 100 parts of boiling 10% acetic acid. The extract is cooled and 40 parts of concentrated hydrochloric acid are added, whereupon 2-p-chloroanilino-4-β-diethylaminoethylamino-quinazoline dihydrochloride is precipitated. It is recrystallised from water and then has M. P. 254°–255° C.

Example 29

6 parts of 2-p-chloroanilino-4-ethoxyquinazoline and 10 parts of N:N'-dimethyl-trimethylene diamine are heated together under reflux at 170°–180° C. for 4½ hours. The reaction mixture is cooled and extracted with 120 parts of boiling 10% acetic acid. The residue is washed with 20 parts of boiling water and the washings are added to the acetic acid extract. To this combined solution caustic soda solution is added until it is just alkaline to Clayton Yellow paper whereupon 2-p-chloroanilino-4-(N-methyl-N-γ-methylaminopropylamino)-quinazoline is precipitated in the form of a somewhat resinous solid. This is dissolved in 20 parts of hot 10% acetic acid and 5 parts of concentrated hydrochloric acid are added, whereupon the dihydrochloride crystallises out. It forms white crystals of M. P. 137°–138° C., solidifying again on further heating and remelting at 220°–250° C.

Example 30

A mixture of 14.5 parts of 2-chloro-4-p-chloroanilinoquinoline and 9 parts of β-diethylaminoethylamine is heated at 130°–140° C. for 14 hours. The reaction mixture is cooled and dissolved in warm dilute hydrochloric acid. The solution is made alkaline with caustic soda and the oil which is liberated is extracted wtih chloroform. This extract is shaken first with 200 parts and then with a further 50 parts of 5% aqueous acetic acid. These aqueous extracts are combined and made alkaline with caustic soda and the liberated oil is again extracted with chloroform. The chloroform solution is dried with anhydrous potassium carbonate and the chloroform is distilled off. The residual oil consists of 2-β-diethylaminoethylamino-4-p-chloroanilinoquinoline, the dihydriodide of which crystallises from aqueous ethanol in prisms of M. P. 248°–249° C. (decomp.).

Example 31

A mixture of 9.35 parts of 2-chloro-4-p-chloroanilinoquinoline, 10 parts of γ-di-n-butylaminopropylamine and 0.1 part of potassium iodide is heated and stirred at 150°–160° C. for 6 hours. The reaction mixture is cooled somewhat and water is added, followed by sufficient caustic soda to produce an alkaline reaction. The oil which separates out is extracted with chloroform. The chloroform is distilled off and to the residue 200 parts of 5% acetic acid are added. The mixture is filtered, the filtrate is made alkaline with caustic soda, and the oil which is precipitated is again extracted with chloroform. The extract is dried over anhydrous potassium carbonate and filtered and the chloroform is distilled off. The residual oil consists of 2-γ-di-n-butylaminopropylamino-4-p-chloroanilinoquinoline, the dihydriodide of which crystallises from a mixture of methanol and ethyl acetate, M. P. 200–202° C.

Example 32

A mixture of 20 parts of 2-p-chloroanilino-4-chloroquinoline, 16 parts of β-diethylaminoethylamine and 0.3 part of potassium iodide is heated and stirred at 180°–190° C. for 16 hours. The reaction mixture is cooled somewhat and dissolved in hot dilute hydrochloric acid. The solution is cooled and made alkaline with caustic soda and the oil which separates is extracted with chloroform. The chloroform is distilled off and to the residue 240 parts of 5% aqueous acetic acid are added. The mixture is filtered, the filtrate is made alkaline with caustic soda and the oil which separates is extracted with chloroform. The extract is dried by means of anhydrous potassium carbonate and filtered and the chloroform is distilled off. 2-p-chloroanilino-4-β-diethylaminoethylaminoquinoline remains as an oil. Its dihydrochloride crystallises from a mixture of ethanol and ethyl acetate and has M. P. 169°–171° C. and its dihydriodide crystallises from aqueous ethanol and has M. P. 252°–254° C.

By working in the manner described in Example 32 but using other appropriate diamines instead of the β-diethylaminoethylamine, the following 4-substituted 2-p-chloroanilinoquinolines are obtained:

Example 33

2-p-chloroanilino-4-γ-diethylaminopropylaminoquinoline, M. P. 153°–155° C.; the dihydrochloride has M. P. 110° C. decomp.

Example 34

2-p-chloroanilino-4-γ-piperidinopropylaminoquinoline dihydrochloride, M. P. 86°–88° C.

Example 35

2-p-chloroanilino-4-γ-dimethylaminopropylaminoquinoline dihydrochloride, M. P. 86°–88° C.

Example 36

2-p-chloroanilino-4-δ-diethylaminobutylaminoquinoline dihydrochloride, M. P. 201°–203° C., decomp.

Example 37

2-p-chloroanilino-4-δ-diethylamino-α-methylbutylaminoquinoline dipicrate, M. P. 230°–232° C., decomp.

Again, working in the manner described in Example 32 but using other 2-arylamino-4-chloroquinolines instead of the 2-p-chloroanilino-4-chloroquinoline, there are obtained the following 2-arylamino-4-β-diethylaminoethylaminoquinolines:

Example 38

2-p-methoxyanilino-4-β-diethylaminoethylaminoquinoline dihydriodide, M. P. 146°–148° C.

Example 39

2-p-methylanilino-4-β-diethylaminoethylaminoquinoline, M. P. 103°–105° C.

Example 40

2-β-naphthylamino-4-β-diethylaminoethylaminoquinoline dihydriodide, M. P. 127°–128° C.

Example 41

A mixture of 17.6 parts of 2-p-chloroanilino-4-chloro-7:8-benzquinoline, 13.5 parts of γ-diethylaminopropylamine and 0.3 part of potassium iodide is heated and stirred at 175°–185° C. for 24 hours. The reaction mixture is cooled and water is added, followed by sufficient caustic soda to produce an alkaline reaction. The oil which separates is extracted with chloroform. The chloroform is distilled off and to the residue 200 parts of 5% aqueous acetic acid are added. The mixture is filtered, the filtrate is made alkaline with caustic soda and the oil which separates is extracted with chloroform. The extract is dried by means of anhydrous potassium carbonate and filtered and the chloroform is distilled off. The oil which remains consists of 2-p-chloroanilino-4-γ-diethylaminopropylamino - 7:8 - benzquinoline, the dihydrochloride of which crystallises from aqueous acetone in fine needles, M. P. 108°–110° C.

By working in the manner described in Example 41 but using other appropriate 4-chloroquinolines instead of the 2-p-chloroanilino-4-chloro-7:8-benzoquinoline, there are obtained the following compounds:

Example 42

2 - (6'-bromo-2'-naphthylamino) -4-γ-diethylaminopropylaminoquinoline, M. P. 149°–150° C.

Example 43

2-p-nitroanilino-4-γ - diethylaminopropylaminoquinoline dihydrochloride, M. P. 182°–184° C.

Example 44

2-p-chloroanilino-3-methyl-4-γ-diethylaminopropylaminoquinoline diperchlorate, M. P. 216°–218° C.

Whereas the above description and examples illustrate many widely varied embodiments of the invention, it will be apparent to one skilled in the art that many other embodiments and variations may be devised without departing from the spirit and scope thereof and accordingly it is to be understood that the invention is not in any way limited except as defined in the following claims.

In the claims below, the expression "N-radical" when referring to a nitrogenous base shall be understood as referring to the radical obtained by removing one of the hydrogen atoms which are (or the only hydrogen atom which is) attached to the nitrogen atom of the specified base. The expression "devoid of acidic substituents" shall be construed as referring to freedom from radicals which are commonly recognized as ionizable, salt-forming acid radicals, as typified by the carboxy, sulfonic acid and phenolic OH radicals.

We claim:

1. A compound selected from the group consisting of the salts and free-base form of quinazoline derivatives of the general formula

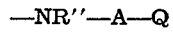

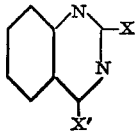

wherein one of the symbols X and X' stands for the N-radical of an arylamine devoid of acidic substituents, while the other of said symbols designates a basic radical of the formula

—NR''—A—Q wherein R'' designates a member of the group consisting of hydrogen and lower alkyl, A stands for an aliphatic radical devoid of acidic substituents, while the radical Q represents the N-radical of a nitrogenous base selected from the group consisting of lower monoalkyl amines, lower dialkyl amines and saturated heterocyclic amines.

2. A quinazoline derivative of the general formula:

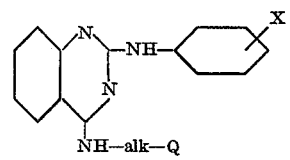

wherein X stands for a halogen radical, "alk" stands for an alkylene radical of not more than 6 C-atoms, and Q represents the N-radical of a lower dialkyl amine.

3. A compound as claimed in claim 2 wherein X is a chlorine radical in the para position.

4. A compound as claimed in claim 3 wherein the alkyl substituents on the N-radical are identical.

5. 2 - p - chloroanilino-4-γ-dimethylaminopropylaminoquinazoline dihydrochloride.

6. 2-p-chloroanilino-4-δ - dimethylaminobutylaminoquinazoline dihydrochloride.

7. 2-p-chloroanilino - 4 - β -diethylaminoethylaminoquinazoline dihydrochloride.

FRANCIS HENRY SWINDEN CURD.
JUSTUS KENNETH LANDQUIST.
CLIFFORD GORDON RAISON.
FRANCIS LESLIE ROSE.

REFERENCES CITED

The following references are of record in the file of this patent:

UNITED STATES PATENTS

| Number | Name | Date |
|---|---|---|
| 2,233,970 | Andersag et al. | Mar. 4, 1941 |

FOREIGN PATENTS

| Number | Country | Date |
|---|---|---|
| 134,279 | Switzerland | Oct. 1, 1929 |
| 669,806 | Germany | Jan. 4, 1939 |

OTHER REFERENCES

Ephraim, Berichte, 26, 2227–2230 (1893).
Niementowski, Berichte, 40, 4285–4294 (1907).
Buchmann et al., J. Amer. Chem. Soc. 64, 1357–1360, June 1942.